(12) United States Patent
Isokangas et al.

(10) Patent No.: US 7,664,265 B2
(45) Date of Patent: Feb. 16, 2010

(54) CONTROLLING COMMUNICATIONS BETWEEN STATIONS

(75) Inventors: Jari Isokangas, Tampere (FI); Sinikka Sarkkinen, Kangasala (FI)

(73) Assignee: Nokia Siemens Networks Oy, Espoo (FI)

( * ) Notice: Subject to any disclaimer, the term of this patent is extended or adjusted under 35 U.S.C. 154(b) by 438 days.

(21) Appl. No.: 10/362,002

(22) PCT Filed: Jul. 31, 2001

(86) PCT No.: PCT/EP01/08856

§ 371 (c)(1),
(2), (4) Date: Aug. 25, 2003

(87) PCT Pub. No.: WO02/15600

PCT Pub. Date: Feb. 21, 2002

(65) Prior Publication Data

US 2004/0039910 A1      Feb. 26, 2004

(30) Foreign Application Priority Data

Aug. 18, 2000   (GB) .................................. 0020443.8

(51) Int. Cl.
*H04K 1/00*     (2006.01)
*H04W 36/00*    (2009.01)
*H04L 9/00*     (2006.01)

(52) U.S. Cl. ........................ 380/247; 455/436; 455/437; 455/411; 380/272

(58) Field of Classification Search ................ 380/249, 380/272, 436–437; 455/436–437, 411
See application file for complete search history.

(56) References Cited

U.S. PATENT DOCUMENTS

| | | | | |
|---|---|---|---|---|
| 5,081,679 A | * | 1/1992 | Dent | 380/272 |
| 5,204,902 A | * | 4/1993 | Reeds et al. | 380/248 |
| 5,293,423 A | * | 3/1994 | Dahlin et al. | 380/272 |
| 5,377,267 A | * | 12/1994 | Suzuki et al. | 380/248 |
| 5,390,252 A | * | 2/1995 | Suzuki et al. | 380/247 |
| 5,778,075 A | * | 7/1998 | Haartsen | 380/272 |
| 5,974,036 A | * | 10/1999 | Acharya et al. | 370/331 |
| 6,418,130 B1 | * | 7/2002 | Cheng et al. | 370/331 |
| 6,771,776 B1 | * | 8/2004 | Rose | 380/272 |
| 6,961,571 B1 | * | 11/2005 | Rune et al. | 455/442 |
| 7,065,340 B1 | * | 6/2006 | Einola et al. | 455/410 |
| 7,123,719 B2 | * | 10/2006 | Sowa et al. | 380/247 |

FOREIGN PATENT DOCUMENTS

| | | |
|---|---|---|
| WO | 99/51051 | 10/1999 |
| WO | 00/36860 | 6/2000 |

OTHER PUBLICATIONS

ETSI: "TS 125 413 Universal Mobile Telecommunications System (IMTS); UTRAN Iu Interface RANAP Signalling (3G TS 24.413 Version 3.0.0 Release1999)," ETSI TS 125 413 V3.0.0, XX, XX, Jan. 2000, pp. 1-147.

* cited by examiner

*Primary Examiner*—William R Korzuch
*Assistant Examiner*—Trang Doan
(74) *Attorney, Agent, or Firm*—Squire, Sanders & Dempsey L.L.P.

(57) ABSTRACT

The present invention relates to relocation of the control of communication between a first station and a second station from a first communication system controller to a second communication system controller. The communication is ciphered by means of a first ciphering key. In the method, after the initiation of the relocation of control of the communication from the first controller to the second controller a request for relocation is transmitted to the second controller. The request contains the first ciphering key and at least one other ciphering key.

20 Claims, 3 Drawing Sheets

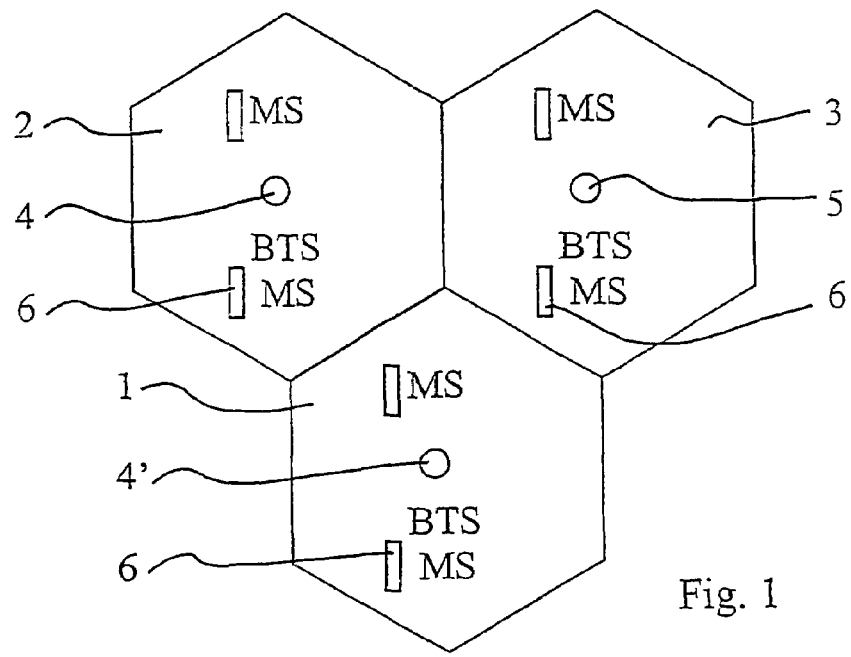
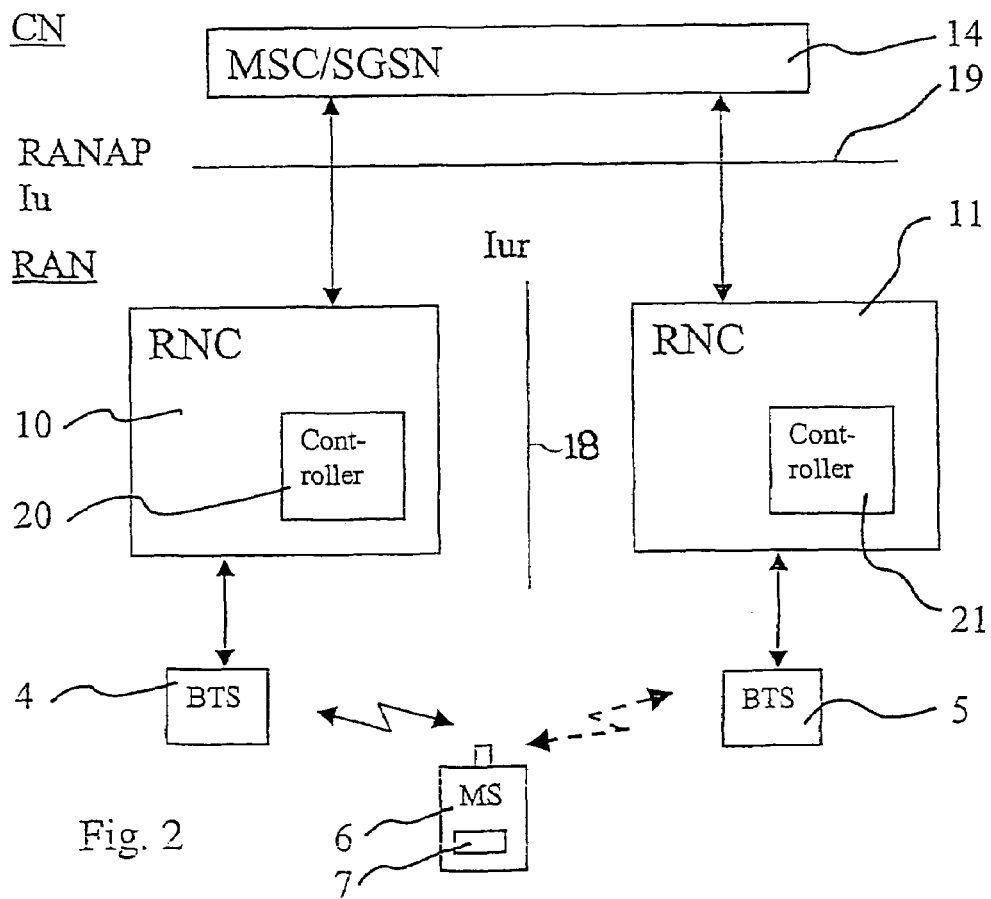
Fig. 1
Fig. 2

CONTROLLING COMMUNICATIONS BETWEEN STATIONS

FIELD OF THE INVENTION

The present invention relates to communication system and in particular, but not exclusively, to relocation of functions controlling ciphered communications between stations from a first controller to a second controller.

BACKGROUND OF THE INVENTION

Communication networks typically operate in accordance with a given standard or specification which sets out what the elements of the network are permitted to do and how that should be achieved. The communication in the networks typically follows predefined rules which are referred to in the following as protocols. The protocols to be used are defined in the associated standards or specifications. The protocols can be used for transmission of necessary control information between the various network elements.

A communication network is a cellular radio network consisting of access entities referred to as cells. In most cases the cell consists of a certain radio access area covered by one or several base transceiver stations (BTS) serving mobile stations (MS) via a radio interface and connected to a base station subsystem (BSS). Several cells cover a larger area, and form the coverage area of a cellular radio network. The cell (or group of cells) and thus the mobile station (MS) (that is sometimes referred to as user equipment UE) within one of the cells of the system can be controlled by a node providing control function. An example of such controller is a radio network controller (RNC) of a universal mobile telecommunication system (UMTS) terrestrial radio access network (UTRAN). The RNC controls the communication between the base station and the mobile station based on predefined protocols, such as Radio Resource Control (RRC) or Medium Access Control (MAC) or Radio Link Control (RLC) protocols. An example of a controller node implemented in the core network (CN) side of the cellular network is a mobile switching center (MSC).

For example, in the $3^{rd}$ generation UMTS a RNC can be connected further to a serving GPRS support node (SGSN) which in turn is connected to a gateway or linking node, for example a gateway GPRS support node (GGSN) or gateway mobile switching center (GMSC), linking the cell to the other parts of the communication system and/or other communication networks, such as to a PSTN (Public Switched Telecommunications Network) or to a data network, such as to a X.25 based network or to an IP (Internet Protocol) based network.

The wireless interface between the mobile station MS and the base station is typically controlled by only one access network controller at time. However, the MS may also be simultaneously controlled by several controller nodes. This may occur e.g. when the cells overlap or in so called soft handoff mode, where the MS may be in communication with two base stations which may be connected to different controllers, or when one controller is controlling another controller controlling the MS. One controller of the plurality of controllers in the system can be defined as a serving (main) controller whereas the others may act as drift i.e. secondary controllers.

The responsibility of controlling a connection between the mobile station and the network may change during an ongoing connection. It is therefore necessary to relocate at least part of the control functions associated with the connection from one controller to another such that the connection will not become disconnected an/or that the quality of the connection remains in an acceptable level. When relocation is decided to be performed, the serving controller or another node of the communication system may initiate the necessary proceeding for the relocation. The relocation of the control function can be refereed to as handover.

For example, in the current third generation partnership project (3GPP) Specifications it is defined that the core network (CN) can request the UTRAN to change the used ciphering and/or integrity protection keys for the air interface. This security procedure is initialised when the core network sends a radio access network application part (RANAP) message 'SECURITY MODE COMMAND' to the UTRAN. Based on this message the UTRAN, and more particularly, the access network controller thereof shall initialise the corresponding security procedure for the air interface. From the CN point of view this security procedure has been completed when the CN receives the RANAP message 'SECURITY MODE COMPLETE' from the UTRAN. Based on this information the CN can be sure that either the new ciphering key has been taken into use for the air interface or the mobile station has rejected the request for ciphering key change. The core network controller will also conclude from the acknowledgement message that the procedure has been terminated at the UTRAN side.

In the presently proposed arrangements the current i.e. ongoing security procedure assumes that the earlier initialised security procedure has already been terminated when the serving RNC requests the core network controller to perform a serving radio network subsystem (SRNS) relocation, i.e. handover between two access network controllers. However, the inventors have found that this may not always be the case. For example, it is possible that the security procedure is not completed if the defined activation time for the key change was originally defined to be a far a way from the current radio link controller sequence number (RLC SN) position. That is, the UTRAN keeps on operating with the "old" key until the timer functions indicates that it is time to change the key. In addition, since the reset procedures in the radio link controller (RLC) will start the transmission of frames from the beginning (from frame No. 0), sequentially occurring RLC reset procedures may have continuously postponed the elapsing of the new ciphering key activation time. The reset procedures is initiated e.g. when the connection quality is found to become poor. Thus it is possible that the mobile station has already acknowledged the ciphering key exchange by sending the RRC acknowledgement message 'SECURITY MODE COMPLETE' to the UTRAN (and which message the UTRAN has subsequently received) and that the new key activation time has not yet elapsed at the mobile station at the time when the serving radio network subsystem relocation procedure is initialised. This is a problem since it may lead into situation where the mobile station and the new or target radio access network controller have different ciphering keys. It is then possible that the relocation procedure fails as the mobile station and the new radio access network are not able to understand each other.

For example, the current RANAP message 'RELOCATION REQUIRED' contains the currently used ciphering key on the air interface inside a "IE: ciphering" key field. This field does not enable the serving RNC to indicate to the target RNC that the earlier generated security procedure was not terminated before the SRNS relocation procedure was started. The inventors have realised that the serving RNC should be able to transmit to the target RNC also that ciphering key which was already agreed with the mobile station in addition to the currently used (i.e. the "old") ciphering key.

This feature is, however, not supported in e.g. the current third generation specifications. The current security modes may not be able to handle properly a situation where the new ciphering key has not yet been taken into a use due to "late" activation time and the serving controller is forced to initialise a relocation procedure. This may happen e.g. if the RRC message 'SECURITY MODE COMPLETE' has been received by the SRNC before the initialisation of the SRNS relocation and before the activation timer at the mobile station has elapsed, i.e. while the mobile station and the currently serving RNC are still using the "old" key. The

SUMMARY OF THE INVENTION

Embodiments of the present invention aim to address one or several of the above problems.

According to one aspect of the present invention, there is provided a method for relocation from a first communication system controller to a second communication system controller of the control of communication between a first station and a second station, the communication being ciphered by means of a first ciphering key, the method comprising: initiating relocation of control of the communication from the first controller to the second controller; and transmitting a request for relocation to the second controller, the request containing the first ciphering key and at least one other ciphering key.

According to another aspect of the present invention there is provided an arrangement in a communication system, comprising: a first entity for adapted control of communication between a first station and a second station, the communication being ciphered by means of a first ciphering key; a second entity adapted for continuing the control of the communication after said communication has been changed to occur between a third station and the second station; an entity for initiating relocation of the control of the communication from the first entity to the second entity; and an entity for generating and transmitting a request for relocation to the second entity, the request containing the first ciphering key and at least one other ciphering key.

According to a more specific embodiment the location request contains information regarding the timing when a ciphering key should be replaced by another key.

The embodiments of the invention may decrease the risk for disconnection of a ciphered connection during handover thereof from one access network controller to another. The transmission of data and/or signalling messages after the relocation may continue normally since in accordance with some embodiments the new controller may be made aware of ciphering key activation times for the radio bearers and the new controller may therefore be made aware of the time when it should change the ciphering key for the radio interface. Some of the embodiments may avoid unnecessary initialisation of security procedures. The embodiments may prevent any additional delays to the start of the data transmission from the new controller to the mobile station. The embodiments may also be used to ensure that the old and the new ciphering keys do not contradict when data transmission is initialised after the completion of the relocation procedure. The relocation may be made faster. This in turn may save radio resources since it the faster relocation enables use of smaller power levels at the new base station. This in turn may decrease the interference caused for the other users in the new cell.

BRIEF DESCRIPTION OF THE DRAWINGS

For better understanding of the present invention, reference will now be made by way of example to the accompanying drawings in which:

FIG. 1 shows three cells of a cellular system;

FIG. 2 shows a part of a communication system where the preferred embodiment of the present invention may be employed;

DESCRIPTION OF PREFERRED EMBODIMENTS OF THE INVENTION

Figure 3:
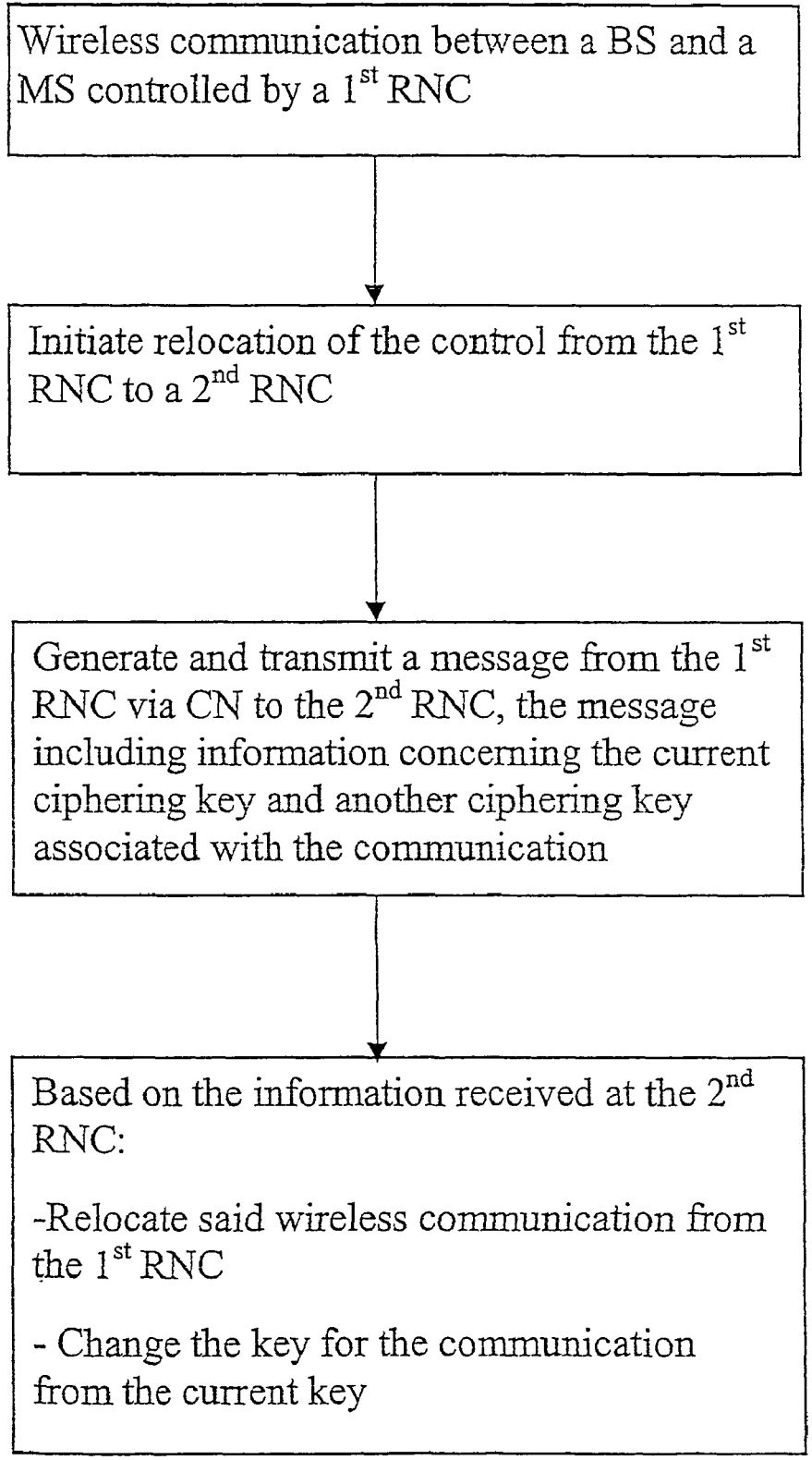
FIGS. 3 and 4 are flowcharts illustrating operation of two embodiments of the present invention.

Reference will be first made to FIG. 1 in which three cells 1, 2, 3 of a cellular telecommunications network are shown. Each cell 1, 2, 3 is served by a respective base transceiver station (BTS) 4', 4, 5. Each base transceiver station (BTS) is arranged to transmit signals to and receive signals from the mobile stations (MS) 6 located in the cell associated with the given base transceiver station. Likewise, each mobile station 6 is able to transmit signals to and receive signals from the respective base transceiver station 4', 4, 5, and also able to move from the coverage area of one cell to the coverage area of another cell, e.g. from cell 2 to cell 3. When a mobile station moves such that the control of the wireless communication between the mobile station and the network apparatus (i.e. the base stations) needs to be relocated from one access network controller to another, this is handled by handover proceedings.

Reference is now made to FIG. 2 which shows in more detail a part of a cellular communication system. As can be seen, the mobile station 6 is in wireless communication with one of the base stations. Typically a number of mobile, stations will be in communication with each base station although only one mobile station is shown in FIG. 2 for clarity. A first base station 4 is connected to a first network controller, which in FIG. 2 is a serving radio network controller SRNC 10. More than one base station is usually connected to each access network controller although only one is shown for clarity. More than one controller may also be provided in a UTRAN network subsystem. The SRNC 10 is connected to elements of the core network CN over an Iu interface 19. A RANAP (Radio Access Network Application Part; in the control plane) protocol can used for L3 (Layer 3) signalling over the Iu interface 19 between the RNCs 10, 11 and an appropriate controller element 14 of the core network CN. The core network element 14 can be e.g. a mobile switching center MSC or a serving GPRS (General Packet radio Service)support node.

The RNC 10 is arranged to control the base station 4, either directly or through an intermediate node (not shown). The controller 10 passes on data to be transmitted to the mobile station 6 by the base station. The controller 10 will also receive from the base station data which the base station has received from the mobile station. The implementation of the communication on between the base station, the mobile station and the controller is known, and will thus not be discussed in detail herein. It is sufficient to note that the interface may comprise channels in both uplink and downlink directions. The data may be sent between the mobile station and the controller in any suitable format. The messages sent from the mobile stations may include information identifying the mobile station (for instance, MS ID and/or IMSI (Mobile Station Identity and/or International Mobile Subscriber Identity, respectively)).

In addition to the serving controller (RNC 10), the cellular telecommunications system of FIG. 2 includes another access network controller RNC 11 controlling the base station 5 of cell 3 of FIG. 1. It is, again, noted that the second controller may also control more than one base station. The second controller may also sometimes be referred to as a drift or target controller (DRNC or TRNC). The serving RNC may be referred to as source controller. The source RNC 10 and target RNC 11 may have an open Iur interface 18 for communication between them.

FIG. 2 illustrates one possible relocation situation wherein the mobile station MS 6 or similar user equipment communicates firstly via the BTS 4 over a radio interface designated by a solid line and then switches to communicate via a new BTS 5, as designated by the dashed radio interface. According to one possibility the change from one base station to another may occur after the mobile station 6 has moved into the service or illumination area of the second base station 5. However, it is to be appreciated that in addition to the movement of the mobile station, there are also other possible reasons for triggering the relocation of the connection to another base station or to another network element, such as network optimization, load balancing, hardware congestion, connection quality improvement, fault in the system or base station and so on.

In order to ensure a proper operation of the system and to avoid disconnecting a possibly ongoing call, at least some of the functions of the network elements have to be relocated for the connection. For example, when a SRNC functionality is to be located from the first RNC 10 to the second RNC 11 at least some protocol termination points of an ongoing connection (such as RRC, RCL and/or MAC protocols) may need to be changed from the first RNC to the second RNC.

The wireless communication, and more particularly, radio bearers (BR) between the base stations and the mobile station is ciphered by means of a ciphering key. The use of different kinds of ciphering keys and techniques for ciphering data is known by the skilled person and will thus not be explained in more detail herein. The ciphering functions may be controlled by a control unit 20 at the serving controller 10 and by a control unit 21 at the target controller 11. The same controllers may be used for performing e.g. the RRC, RLC and MAC functions. The new RNC needs also information regarding the used ciphering key The following describes in more detail an embodiment in which the serving RNC 10 is enabled to send the new and the currently used ciphering keys to the target RNC 11. In addition, it is also described how it is possible to transmit activation times that are defined for each radio bearer (RB) to the target RNC 11.

The relocation request, such as the RANAP 'RELOCATION REQUIRED' message, is typically transmitted from the UTRAN to the core network CN over the Iu interface when the serving RNS relocation procedure is to be initialised by the UTRAN. As explained above, the conventional relocation requests contain only the currently used ciphering key inside a predefined field, such as in the "IE: ciphering" key field. Therefore the serving RNC 10 is not capable to indicate to the target RNC 11 that the mobile station will change the key after a certain period, for example since the earlier generated security procedure was not terminated before the serving RNS relocation procedure was started. Therefore the target RNC 11 may receive the "old" key which will not be used by the mobile station 6 after the timer function 7 thereof has triggered a change from the "old" key to a "new" key.

The handover procedure may be Initiated by a 'HO_REQUIRED' message, which the RNC 10 sends to the MSC/SGSN 14. The message may comprise information necessary for setting up the handover, namely identification of the target RNC 11, possible identifiers for the Iur interface connections between RNC 10 and RNC 11, and any necessary protocol control block information specifying the protocols and the current state of the protocols in use. Upon reception of the 'HO_REQUIRED' message the controller 14 starts to create new Iu connections to the target RNC 11. The core network controller 14 also sends a 'HO_REQUEST' message to RNC 11 over the Iu interface 19, which message includes the same information necessary for setting up the handover at the target controller 11.

Figure 4:
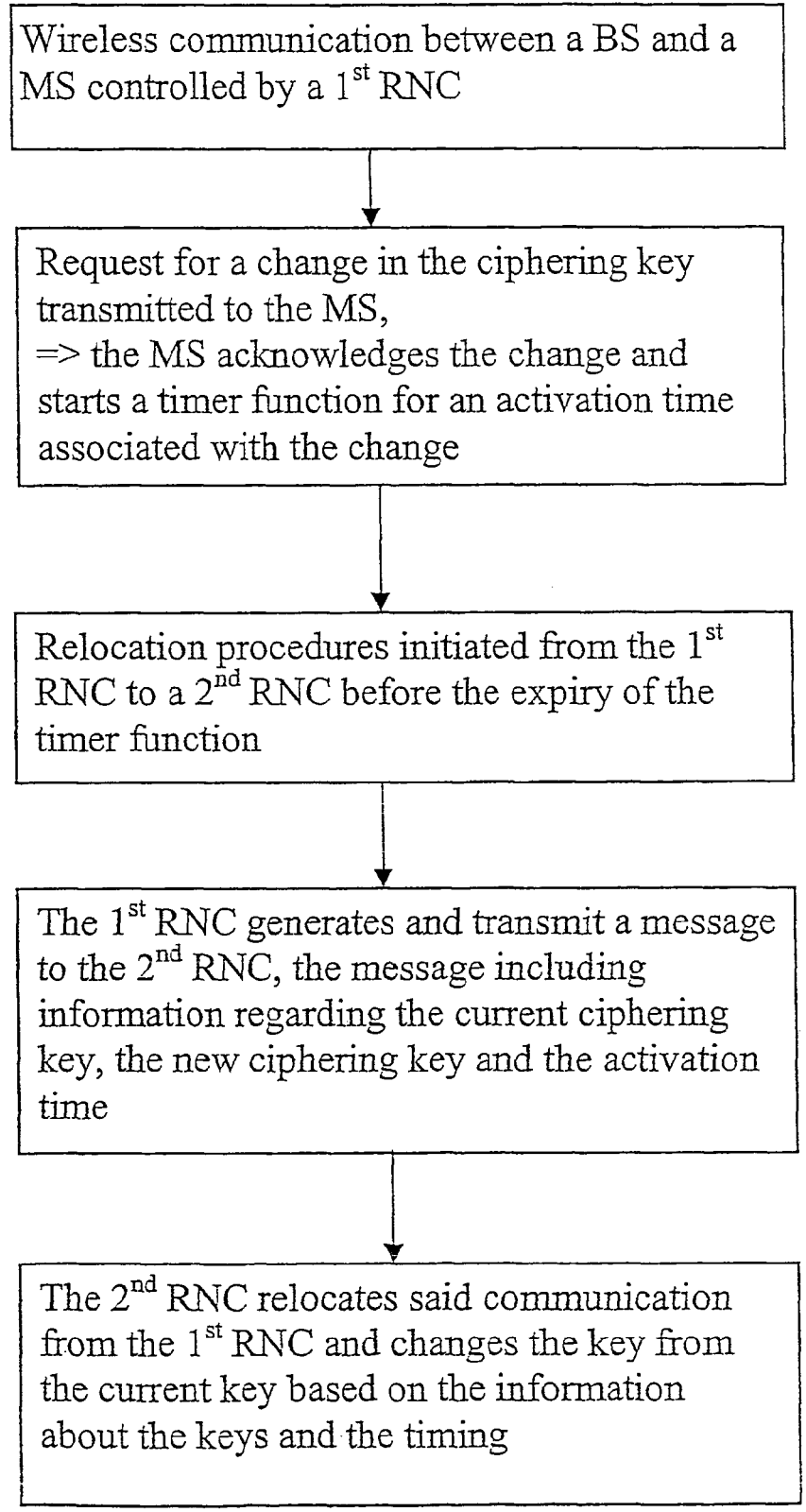

As shown by the flowchart of FIG. 3, information of another ciphering key is added into the relocation request message. For example, a new "IE: new ciphering key" field may be added in the RANAP relocation request message. This new field is used to indicate to the target RNC 11 that it should start using, instead of the current key, a new ciphering key for the air interface. The use of the new key may start immediately or after a predefined time. According to a preferred embodiment shown in the FIG. 4 flowchart the relocation request message includes also information regarding the timing of the change of keys. Possibilities for defining and transmission of the appropriate timing for the change will be explained later in this specification.

The new ciphering key field may also be used to indicate for the core network CN side that the timer setup for the security procedure shall be stopped for the duration of the serving RNS relocation procedure and that no new request for key changes, such as RANAP 'SECURITY MODE COMMAND' should be sent to the serving RNC 10 during that time.

The new key field may be required only in instances where the termination of the security procedure has been interrupted by the serving RNS relocation procedure. Therefore it may be preferred to implement this field as an optional field in the RANAP 'RELOCATION REQUIRED' message.

If the mobile station 6 has accepted the new ciphering key and the activation timing for the radio bearer (RB) upon the RRC security mode procedure, the mobile station expects the ciphering key to be changed when the activation time expires. This may cause problems on the network side, because the current source RNC 10 should inform the target RNC 11 about the new ciphering key and the agreed activation time for it. Therefore it may be required that the serving RNC and the target RNC also exchange information regarding the agreed activation times for each radio bearer (RB) in addition to the information associated with the different keys. Thus in the preferred embodiment mechanism the information between the source RNC 10 and the target RNC 11 comprises information of the new and the old ciphering keys and the agreed activation times of each radio bearers for the new ciphering key.

The activation time information was already sent to the mobile station 6 inside the RRC 'SECURITY MODE REQUEST' message, and therefore the mobile station assumes that the ciphering key is going to be changed based on the agreed activation times. Upon the serving RNS relocation procedure this information may be sent to the target RNC 11 inside the RRC initialisation information (for more information about this feature, see e.g. 3GTS 25.331, chapter 14.10). The RRC initialisation information contains a set of parameters on which the target RNC 11 may base the configuration of e.g. the radio resource control protocol (RRC), medium access control protocol (MAC), radio link control protocol (RLC), and/or packet data convergence protocol (PDCP) entities.

According to a possibility the timing is indicated by a data frame sequence number. That is, the information includes the number of the frame from which on (either including the indicated data frame or from the next one) the ciphering key should be changed. A possibility is to add a separate RLC sequence number field into the relocation request information. One field is preferably added for each radio bearer from the corresponding CN domain. This field may then be used to indicate to the target RNC 11 the RLC sequence number from which on the new ciphering key shall be taken into a use. In other words, to indicate the time when the given activation times for the RB(s) elapse at the mobile station.

It should be appreciated that it is possible to transmit information about more than two keys between the controllers. This may be required e.g. if several keys are used simultaneously for communication between the mobile station and the base station (e.g. for simultaneous voice and data calls) or when several subsequent relocations and/or security mode request have lead to a situation where it is possible that several different possible keys exist at the same time.

In an embodiment initialisation of the SRNS relocation procedure is forbidden until a RANAP message 'SECURITY MODE COMPLETE' has been sent to the core network. It is also possible that before the initialisation of the SRNS relocation procedure the serving RNC repeats the security procedure for the air interface and advances the activation time for the new ciphering key by sending the new activation time to the mobile station. After this the RNC waits until the new ciphering has been taken into a use in order to send the RANAP message 'SECURITY MODE COMPLETE' to the core network. According to a still further possibility a new RRC message is created for calling the previously generated security procedure off. The SRNS relocation procedure can be initialised after the mobile station has acknowledged this message.

It should be appreciated that whilst embodiments of the present invention have been described in relation to mobile stations, embodiments of the present invention are applicable to any other suitable type of user equipment.

The exemplifying cellular telecommunications network has been described by using the terminology of a proposed Universal Mobile Telecommunications System (UMTS) standard. However, it is to be appreciated that the invention is not restricted to UMTS but can be implemented in any standard. Examples of these include, without any intention to restrict the possible communication systems to these, any of the code division multiple access (CDMA) based systems or any of the time division multiple access (TDMA) based systems or any of the frequency division multiple access (FOMA) based systems or any hybrids thereof.

It should also be appreciated that base stations can sometimes be referred to as node B. In addition, the term cell is intended to cover also a group of cells in instances where more than one cell is controlled by a controller entity (for instance a URA update).

The above discusses the transfer of information between two radio network controllers and the between the radio network controller and the core network controller. Embodiments of the present invention can be applicable to other network elements where applicable.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   initiating relocation of control of communication from a first controller to a second controller configured to control communication between a first station and a second station, the communication being ciphered using a first ciphering key;
   transmitting a request for relocation to the second controller, the request comprising the first ciphering key and at least one other ciphering key, the at least one other ciphering key being different from the first ciphering key used by the first controller; and
   subsequently ciphering said communication with the second station using said other derived ciphering key,
   wherein said first ciphering key and said at least one other ciphering key perform ciphering of said communication by ciphering data included in said communication and during said communication between said first station and said second station.

2. The method as claimed in claim 1, further comprising: ciphering communication with the second station using the other ciphering key without intervention from the second controller.

3. The method as claimed in claim 2, further comprising: the first controller transmitting to the second station a cipher request requesting the second station to cipher communication with the first station by using the other ciphering key.

4. The method as claimed in claim 3, further comprising: in response to the said cipher request, beginning by the second station to cipher communication with the first station by using the other ciphering key after a delay.

5. The method as claimed in claim 4, further comprising: including, in the request for relocation, data indicative of at least one point after which the communication with the first station is to be ciphered using the other ciphering key.

6. The method as claimed in claim 1, further comprising: controlling, in the second controller, a third station to begin ciphering communication with the second station by using the other ciphering key at the point indicated in the request for relocation.

7. The method as claimed in claim 1, further comprising: including in the location request an additional field for transferring information of the other ciphering key.

8. The method as claimed in claim 7, wherein the additional field is optional.

9. The method as claimed in claim 1, further comprising: including in the request for relocation a relocation request message based on a radio access network application part protocol.

10. The method as claimed in claim 1, further comprising: including in the request for relocation information regarding activation times of the at least one other ciphering key for each radio bearer to be relocated under control of the second controller.

11. The method as claimed in claim 10, further comprising: including the information of the activation times in radio resource control initialization information.

12. The method as claimed in claim 5, further comprising: including in the request for relocation the sequence number of a data frame from which the other ciphering key is to be used for the ciphering of the communication.

13. The method as claimed in claim 12, further comprising: including in the request for relocation a sequence number filed for each radio bearer to be relocated from the first controller.

14. The method as claimed in claim 12, wherein the sequence number comprises a radio link control protocol sequence number.

15. The method as claimed in claim 1, further comprising: transmitting the request for relocation from the first controller to a core network controller;

transmitting, by the core network controller, a relocation request to the second controller; and disabling, by the core network controller, any security procedures requiring a change of the ciphering keys for the duration of the relocation procedures in response to the request from the first controller.

16. The method as claimed in claim 1, wherein the first station is a base station of a cellular communication system, the second station is a mobile station, and the first and second controllers are radio access network controllers of the cellular communication system.

17. A system, comprising:

a first entity configured to control communication between a first station and a second station, the communication being ciphered using a first ciphering key;

a second entity configured to continue the control of the communication after said communication has been changed to occur between a third station and the second station;

an entity configured to initiate relocation of the control of the communication from the first entity to the second entity; and an entity configured to generate and transmit a request for relocation to the second entity, the request containing the first ciphering key and at least one other ciphering key for ciphering said communication with the second station, the at least one other ciphering key being different from the first ciphering key used by the first entity, wherein said first ciphering key and said at least one other ciphering key perform ciphering of said communication by ciphering data included in said communication and during said communication between said first station and said second station.

18. An apparatus, comprising:

an initiating unit configured to initiate relocation of control of the communication from a first controller to a second controller for control of communication between a first station and a second station, the communication being ciphered using a first ciphering key; and a transmitting unit configured to transmit a request for relocation to the second controller, the request containing the first ciphering key and at least one other ciphering key for ciphering said communication with the second station, the at least one other ciphering key being different from the first ciphering key used by the first controller, wherein said first ciphering key and said at least one other ciphering key perform ciphering of said communication by ciphering data included in said communication and during said communication between said first station and said second station.

19. An apparatus, comprising:

initiating means for initiating relocation of control of the communication from a first controller to a second controller for control of communication between a first station and a second station, the communication being ciphered by ciphering means of a first ciphering key; and transmitting means for transmitting a request for relocation to the second controller, the request containing the first ciphering key and at least one other ciphering key for ciphering said communication with the second station, the at least one other ciphering key being different from the first ciphering key used by the first controller, wherein said first ciphering key and said at least one other ciphering key perform ciphering of said communication by ciphering data included in said communication and during said communication between said first station and said second station.

20. An apparatus, comprising:

controlling means for controlling communication between a first station and a second station, the communication being ciphered using a first ciphering key;

continuing control means for continuing to control the communication after said communication has been changed to occur between a third station and the second station;

initiating relocation means for initiating relocation of the control of the communication from the first entity to the second entity; and generating and transmitting means for generating and transmitting a request for relocation to the second entity, the request containing the first ciphering key and at least one other ciphering key for ciphering said communication with the second station, the other ciphering key being different from the first ciphering key used by the first entity, wherein said first ciphering key and said other ciphering key perform ciphering of said communication by ciphering data included in said communication and during said communication between said first station and said second station.

* * * * *